(12) United States Patent
Le Van Suu

(10) Patent No.: US 6,606,609 B1
(45) Date of Patent: *Aug. 12, 2003

(54) APPARATUS AND METHOD FOR OPERATING AN INTEGRATED CIRCUIT

(75) Inventor: Maurice Le Van Suu, Romainville (FR)

(73) Assignee: SGS-Thomson Microelectronics S.A., Gentilly (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/636,635

(22) Filed: Apr. 23, 1996

(30) Foreign Application Priority Data

Apr. 28, 1995 (FR) ............................................ 95 05176

(51) Int. Cl.$^7$ .............................. G06F 9/44; G06F 15/18
(52) U.S. Cl. ............................... 706/1; 706/52; 706/10; 706/900
(58) Field of Search ............................... 395/3, 61, 900, 395/11; 706/1, 52, 900, 10

(56) References Cited

U.S. PATENT DOCUMENTS

| | | | | |
|---|---|---|---|---|
| 5,259,063 A | * | 11/1993 | Salazar ........................... | 395/3 |
| 5,261,036 A | * | 11/1993 | Nakano ........................ | 706/52 |
| 5,361,371 A | | 11/1994 | Kawamoto et al. ......... | 395/800 |
| 5,524,174 A | * | 6/1996 | Eichfeld et al. ................ | 395/3 |
| 5,600,757 A | * | 2/1997 | Yamamoto et al. ............ | 395/3 |

FOREIGN PATENT DOCUMENTS

| | | | | |
|---|---|---|---|---|
| DE | A-42 25 758 | 2/1996 | ........... | G06F/15/20 |
| EP | A-0 498 454 | 8/1991 | ........... | G06F/9/445 |
| EP | A-0 455 345 | 11/1991 | ............. | G06F/9/38 |

OTHER PUBLICATIONS

Ikeda et al. "A fuzzy inference coprocessor using a flexible active–rule–driven architecture," IEEE Int'l Conf. on Fuzzy Systems, Mar. 1992, pp. 537–544.*

Jaramillo–Botero, "A high speed parallel architecture for fuzzy inference and fuzzy control of multiple processes," Proceedings of the Third IEEE Conf. on Fuzzy Systems, Jun. 1994. pp. 1765–1770, vol. 3.*

Eichfeld, An 8 b fuzzy coprocessor for fuzzy control, 1993 IEEE Int'l Conf. on Solid–State Circuits, pp. 180–181, 286, Feb. 1993.*

Hilhorst, Max A., et al., "A Broad–Bandwidth Mixed Analog/Digital Integrated Circuit for Measurement of Complex Impedances," IEEE Journal of Solid–State Circuits, vol. 28, No. 7, pp. 764–769, Jul. 1993.*

Wang, Zhenfeng, et al., "Single–Chip Realization of a Fuzzy Logic Controller with Neural Network Structure (NNFLC)," 23rd Int'l Symposium of Multiple–Valued Logic, pp. 68–73, 1993.*

French Search Report from French Patent Application No. 95 05176, filed Apr. 28, 1995.

Electronic Engineering, vol. 65, No. 795, Mar. 1, 1993, p. 83 "Combining Fuzzy Hard–Ware With the Arm Core".

* cited by examiner

Primary Examiner—George B. Davis
(74) Attorney, Agent, or Firm—Wolf, Greenfield & Sacks, P.C.; James H. Morris

(57) ABSTRACT

An integrated circuit comprising a logic processor and a fuzzy logic coprocessor is disclosed which processes a plurality of analog inputs. The logic processor and fuzzy logic processor are combined in the form of a single integrated circuit. The integrated circuit accepts a plurality of analog inputs which are digitized and provided as output to a display peripheral or are used to control an actuator peripheral such as a control unit for a valve. The integrated circuit includes means for loading or exchanging informational elements with other units of an installation.

13 Claims, 3 Drawing Sheets

APPARATUS AND METHOD FOR OPERATING AN INTEGRATED CIRCUIT

CROSS REFERENCE TO RELATED APPLICATIONS

This application claims priority to commonly-owned, co-pending U.S. patent application Ser. No. 08/636,534 entitled "Device For Putting An Integrated Circuit Into Operation," filed Apr. 23, 1996 by M. G. Le Van Suu.

BACKGROUND OF THE INVENTION

1. Field of the Invention

The present invention relates to a method for putting into operation an integrated circuit that comprises a logic processor, a program memory of the logic processor and a fuzzy logic coprocessor.

2. Discussion of the Related Art

The making of an integrated circuit such as this is subject to constraints related to the structure of the program memories of the processor and of the fuzzy logic coprocessor. At the present time, a system comprising such a processor and such a coprocessor is not made in the form of a single integrated circuit. What has to be done, to obtain an equivalent circuit, is to arrange and organize the working of several different circuits with respect to one another. It may be imagined that, to obtain a single integrated circuit, it might be enough to integrate these two circuits (i.e. make them together) on one and the same monolithic integrated circuit. In practice, this is not possible in view of the fact that the memory structures are different for a fuzzy logic coprocessor for which the drawings and manufacturing masks are already available and for a logic processor for which the drawings and manufacturing masks are also already available. The combining, at low cost of two circuits of this type becomes impossible: the integrated circuit manufactured would be too big, and not easy to make. Indeed, the technological constraints of manufacture will affect output and the ability of the final circuit to be tested.

One approach would consist in entirely merging the characteristics of a known type of processor with the characteristics of a known type of fuzzy logic processor. However this approach, which amounts to redefining an entire new processor, is far too lengthy and costly to be implemented. In a patent application filed on even date entitled Device For Putting An Integrated Circuit Into Operation, which is incorporated herein by reference, it is planned, in order to resolve this problem, that the fuzzy logic processor will be provided with a volatile random-access memory. A phase for starting the integrated circuit, when the power is turned on, involves activating the loading of the volatile memory with the contents of a part of the program memory of the logic processor. This procedure resolves the above-mentioned problems of architecture and design.

However, such a system can be used only if there is a priori knowledge of the instructions to be stored in the program memory of the fuzzy logic processor. Such a situation arises for example if it is required to carry out the large-scale production of an appliance (for example a suction hood) provided with an integrated circuit designed to make this appliance work. However, there are cases where the a priori knowledge of instructions to be loaded into the program memory of the fuzzy logic processor either is not confirmed or subsequently has to be brought into question.

This knowledge is not confirmed in the finalizing stages when tests are made to ascertain that an installation will work as required. A finalizing process of this kind requires setting up of the installation (as in the case, for example, of a heating installation in a building), positioning of the integrated circuits to manage these instruments, and testing of the operation of the installation in every situation.

FIG. 1 shows, for example, a schematic view of such an installation. A set of sensors 1 to 3 measuring, for example, the temperature T° and the pressure P delivers measurement signals. These measurement signals are conveyed to a multiplexer 4 of an electronic integrated circuit 5. The multiplexer 4 is linked to an analog-digital converter 6 that is itself linked to a processor 7. The processor 7 receives the information elements and processes them according to a program contained in a program memory 8 to which it is linked by an address bus 9 and a data bus 10. These data elements are then used either as commands to be applied to a peripheral actuator 11 or as such to be displayed on a display device 12 of the installation. The actuator peripheral 11 is, for example, a control unit for a valve. The processor 7 manages all these elements, in particular a decoder 13 of the memory 8 and an input/output device 14 of the integrated circuit 5, by means of a control decoder 15 which produces commands C applied to these external peripheral units as well as to the internal circuits 4, 6, 13, 14.

When the processing of the data elements coming from the sensors entails heavy work in view of the complexity of the phenomenon to be managed by the installation, an integrated circuit 16 including a fuzzy logic processor 17 is used in a known way. The fuzzy logic processor 17 is linked with its program memory 18 which contains rules by virtue of which the data elements have to be processed. The working of such a circuit 16 is known per se. The circuit 16 receives, in a natural way, the data elements through the data bus 10 and a performance command C delivered by the decoder 15. To carry out the processing, the processor 17 has a mode of operation of its own linked to the program recorded in a non-volatile way in its memory 18.

The set of integrated circuits 5 and 16 is installed on the devices of the installation and connected to a central processing unit by means of the input/output circuit 14 that enables the exchange of information elements with the other units of the installation by means of a transmission channel, herein represented by only two wires and working according to an RS232 series type protocol (of the ASCII type for example). A link by carrier current or other means using this same type of protocol can also be envisaged.

When such a system is being finalized, for example when one of the sensors 1 to 3 is changed, if its dynamic range is different from the originally planned dynamic range, then the contents of the memory 18 need to be changed. This implies complicated to-and-fro operations between each device in which the system of FIG. 1 is installed and the central site where there are means available to modify its contents. Such an approach is not practical to implement and it is an aim of the invention to resolve this problem.

SUMMARY OF THE INVENTION

In the invention, to resolve this and other problems, there is provision for replacing the memory 18 by a preferably volatile but essentially erasable and electrically programmable memory (EEPROM), and above all for prompting the loading of its program by means of an input/output circuit 14. In the invention, this loading then is done under the control of the main processor 7 which will manage the input/output circuit 14 and, with its address and data bus, activate the loading of the volatile memory that will replace the memory 18. Thus, in a manner complementary to the spirit of the patent application filed on the same date and mentioned here above, it is possible to activate the remote loading, in the memory, of a part of the program stored in the memory 8 or else, according to the present invention, the storage in this memory of information elements available, as and when they arrive, in the input/output circuit 14.

BRIEF DESCRIPTION OF THE DRAWINGS

The invention will be understood more clearly from the following description, made with reference to the appended drawings. These drawings are given purely by way of an indication and in no way restrict the scope of the invention. Of these figures.

DETAILED DESCRIPTION

Figure 1:
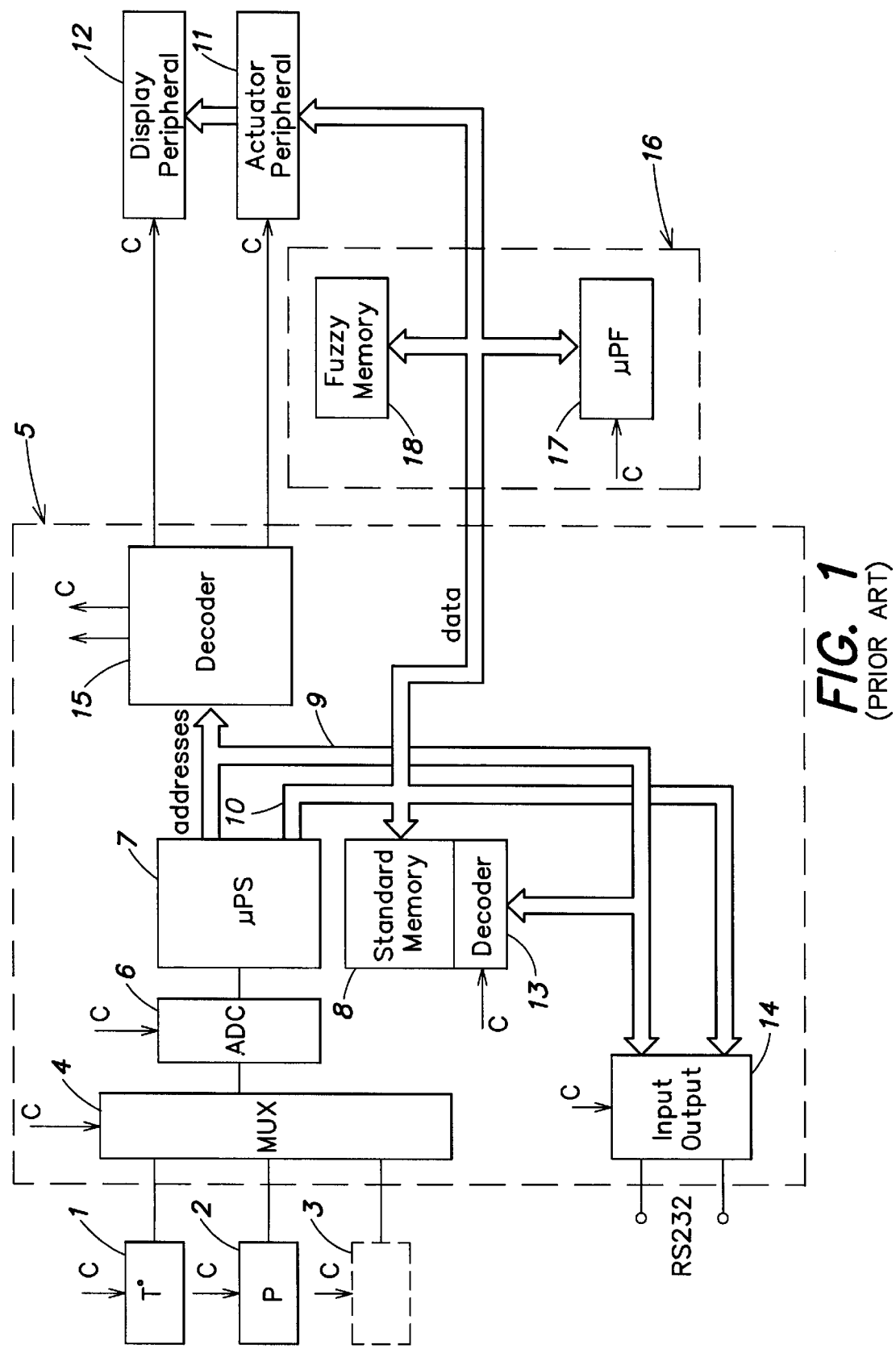
FIG. 1 shows an already-described view of a system according to the prior art.
Figure 2:
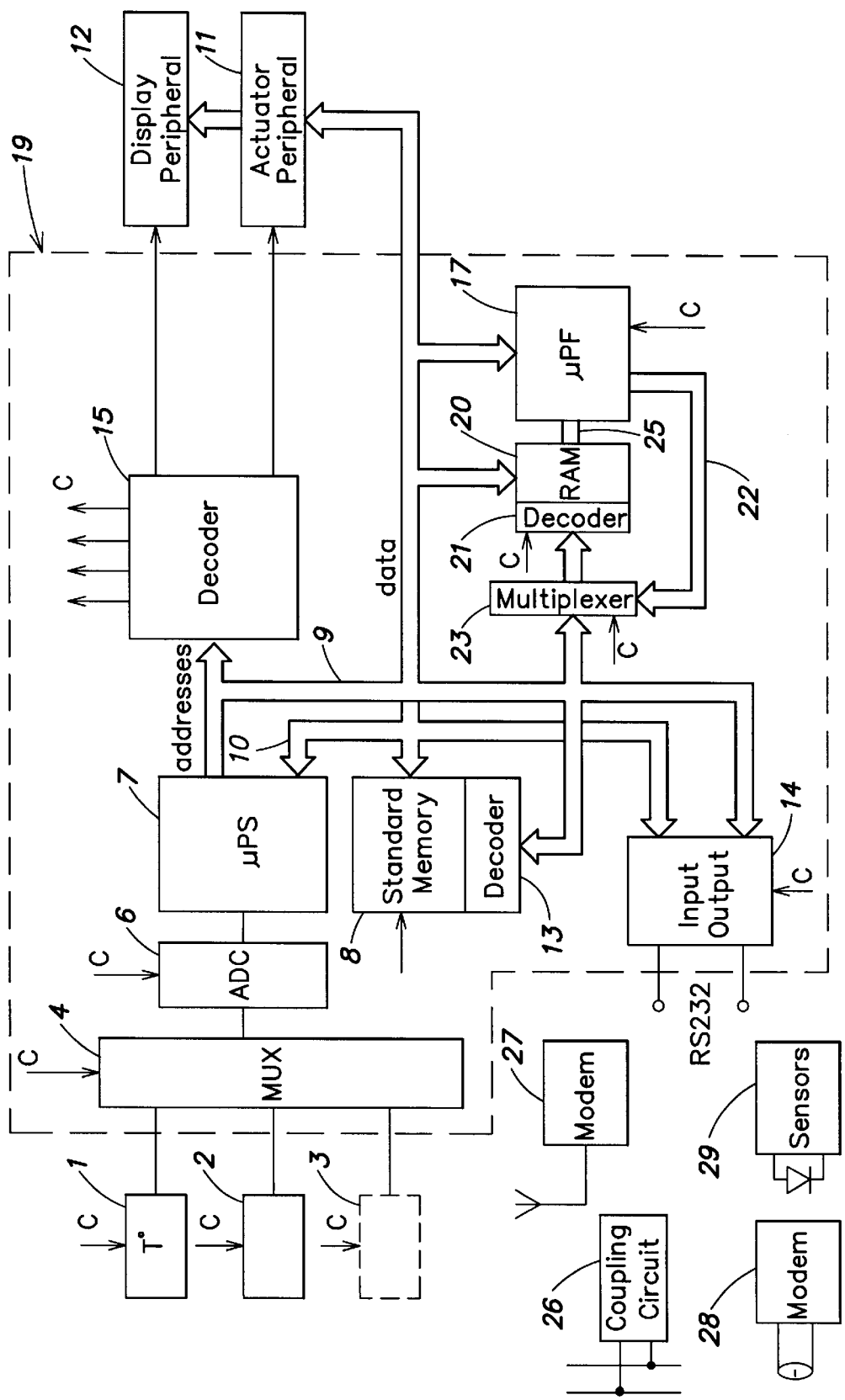
FIG. 2 shows a schematic view of a circuit that can be used to implement the method of the invention.

FIG. 2 shows a device that can be used to implement the method of the invention. This device has a monolithic integrated circuit 19 with the same elements, having the same reference numbers, as those of FIG. 1. It can be seen that the non-volatile fuzzy memory 18 has been replaced by a volatile memory 20 and that, furthermore, this volatile memory 20 receives, in its address decoder 21, the address bus 9 of the processor 7. Hereinafter in this description, reference shall be made to a volatile memory for the memory 20 although it may be an EEPROM type of essentially electrically erasable programmable memory or even a battery-saved RAM type of memory. In fact, the memory 20 may also be directly linked with the processor 17 by means of its address bus 22. To this end, the address bus 22 and the address bus 9 lead to a multiplexer 23 which furthermore receives the commands C produced by the decoder 15. The multiplexer 23 is linked to the decoder 21.

The invention works as follows. When the contents of the memory 20 have to be modified with available external signals, an address signal is produced with a logic processor 7. This address signal is conveyed by the bus 9 and transmitted by the multiplexer 23 to the decoder 21. This address signal enables the selection of a word or a set of memory words of the memory 20 where it is sought to store a new piece of information. Furthermore, from the exterior of the integrated circuit, signals are sent on the input/output circuit 14. These signals represent information elements to be stored at the address selected in the memory 20. In a variant the circuit 14 comprises a memory for storing the data and for permitting a delayed storing in the memory 20. A set of commands C is then produced with the decoder 15. This set of commands makes it possible first to configure the multiplexer 23 and second to make the circuit 14 work so that it places information elements, received by it from the outside world, on the data bus 10. Finally, the commands C prompt the writing, at the selected position in the memory 20, of the information elements available in the bus 10. The setting of the pace at which this operation takes place is done under the control of the processor 7. This processor is capable, in a standard way, of receiving and verifying the nature of the messages received by the input/output circuit 14 and then carrying out the processing of these messages, in this case their storage in the memory 20.

FIG. 2 shows the microprocessor 17 linked with its memory 20 by means of an extension of the data bus 10. However it is possible, for certain already-existing coprocessor architectures, to choose types of direct links 25 between this processor and its program memory.

Rather than an RS232 type of link, it is possible, beyond this link, to have a coupling circuit 26 that enables the circuit 19 to be coupled to the electrical mains system so as to use carrier currents to convey the information elements. It is also possible to use modems 27 and 28 respectively enabling radioelectrical transmission or transmission by coaxial cable. It is also possible to use optoelectronic sensors 29 to transmit and receive infrared rays representing information elements exchanged between the circuit 19 and the outside world.

The program placed in the memory 8 of the processor 7 therefore has a set of instructions to be used to make the processor 7 work as a programming unit of the memory 20. Once the programming of this memory is done with the processor 7, commands are sent to the decoder 15 enabling the multiplexer 23 to switch over so as to subsequently enable the normal link between the memory 20 and the processor 17 by means of the bus 22.

Figure 3:
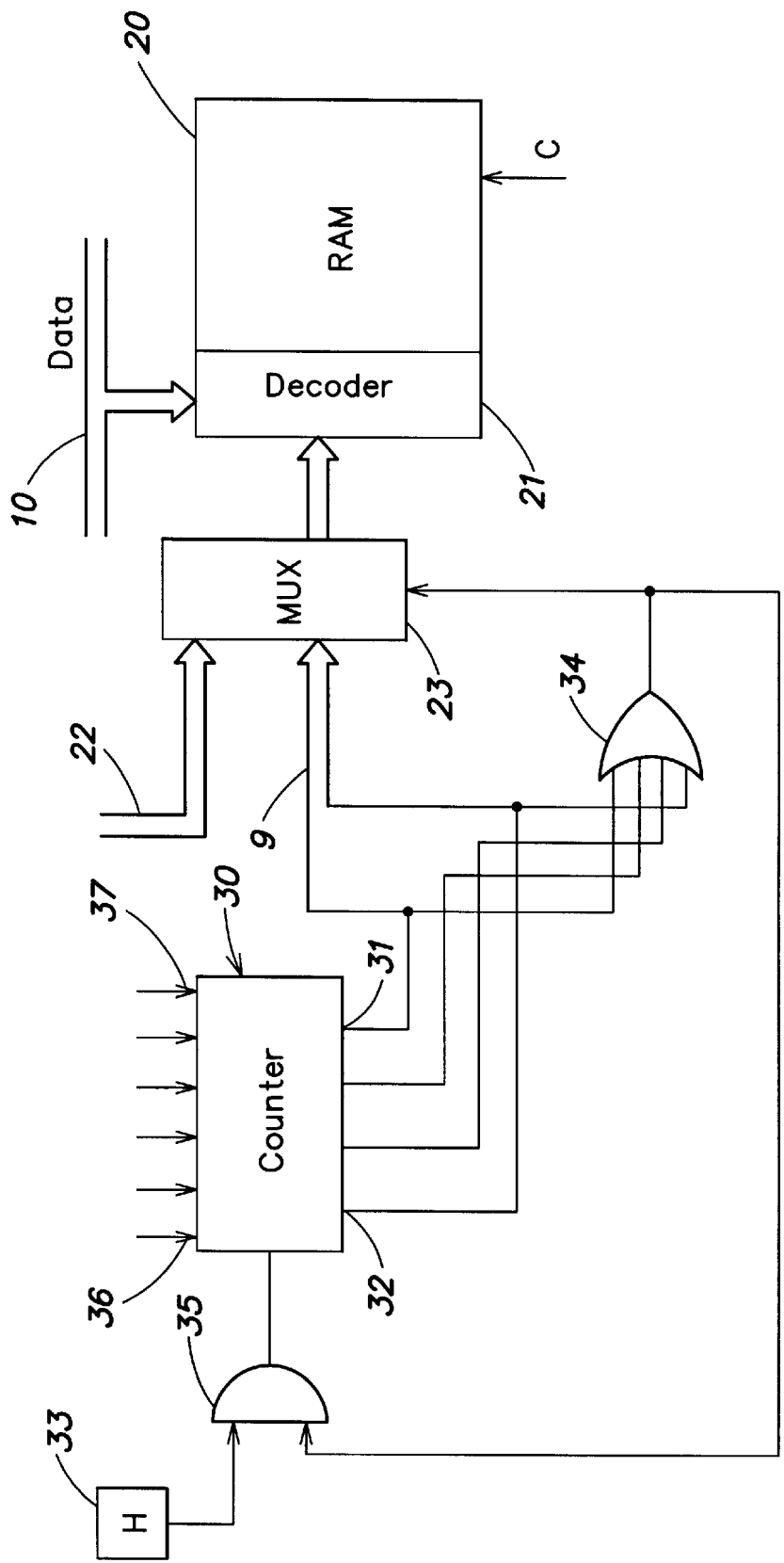
FIG. 3 shows a view of a sequencing system that enables the loading of the working memory of the processor 17.

FIG. 3 gives a view, in one example, of the means of carrying out the operation to program the memory 20. The microprocessor 7 may have, for example, a counter 30 placed in a counting state depending on the number of memory words to be recorded in the memory 20. By its output wires 31 to 32, this counter delivers electrical states that are applied through the multiplexer 23 to the decoder 21. These electrical states constitute an address. At each counting pulse of a clock 33, the counter 30 changes its state producing a following electrical state which is interpreted, additionally, by the decoder 23 as being a new address. Depending on the architecture chosen, the clock pulse 33 will be produced by the processor 7 or, preferably, it will be a result of the pace-setting operation resulting from the detection, by the input/output circuit 14, of the information elements that come from it.

For example, if eight-bit words are to be recorded, the input/output circuit 14 will comprise a divide-by-eight circuit in its synchronization circuit to produce a pulse for every eight bits received (whether these bits are ones or zeros). Consequently, the counter 30 of the processor 7 places, on the address bus 9, the addresses corresponding to the storage in the memory 20. At each clock stroke 33, the memory 20 records the data elements available at the bus 10 at the appropriate address. To this end, at each clock stroke, it receives a write command C.

The outputs 31 to 32 of the counter are furthermore linked in a simplified way to an OR gate 34 whose output state is always different from zero so long as the address available on the wires 31 to 32 is not 00 . . . 00. As soon as this final address is produced by the counter 30, the gate 34 switches over. Its output signal is introduced, in common with the counting signal of the clock 33, at the inputs of an AND gate 35. As soon as the state 00 . . . 00 is reached, the counting stops even if the clock 33 continues, as it happens, to put through pulses.

As a variant, the command C for switching over the decoder 24 may be produced directly by the output of the gate 34 linked to the control input of the multiplexer 24.

The initial value laid down in the counter 30 may be fixed by the processor 7 which applies corresponding electrical states to the setting inputs 36 to 37 of the counter 30 before the loading to operation.

When the signals used to program the memory 20 come from the circuits 26 to 29, preferably analog-digital converters will be used in the input/output circuit 14 to produce binary signals out of signals that are normally analog signals. This will be especially the case when the operation is a filtering or processing operation of the so-called delta-sigma type to recover analog type transmission information elements and thus secure a transmission of information.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for putting into operation an integrated circuit that comprises a logic processor, a program memory of the logic processor, a fuzzy logic coprocessor, and a random-access memory linked with the fuzzy logic processor, said method comprising the steps of:

producing an address signal by the logic processor to gain access to a memory zone of the random-access memory;

receiving, by the logic processor directly through an analog-to-digital converter, one or more information elements corresponding to one or more analog inputs;

processing the one or more information elements;

receiving signals from outside the integrated circuit to an input/output circuit of the integrated circuit, said received signals including executable program instructions to be executed by the fuzzy logic coprocessor;

providing, under control of the logic processor, electrical states corresponding to the received signals on a data bus linked with the random-access memory; and producing a command signal with the logic processor in order to store information in the memory zone of the random-access memory that has been accessed, said information representing the executable program instructions to be executed by the fuzzy logic coprocessor and wherein said information corresponds to the electrical states.

2. The method according to claim 1, wherein:

the address signal is produced with a up/down counter controlled by a clock.

3. The method according to claim 2, wherein:

the up/down counter is configured with an initial value before its countdown operation is performed.

4. The method according to claim 1, wherein:

the data bus connected to the random-access memory is connected to a data input/output circuit of the logic processor.

5. The method according to claim 1, wherein:

the input/output circuit of the integrated circuit is provided with a circuit for connection to a transmission system.

6. The method according to claim 5, wherein:

the input/output circuit is provided with analog-digital and digital-analog conversion circuits.

7. The method according to claim 1, wherein:

the input/output circuit of the integrated circuit operates according to an RS232 type protocol.

8. The method according to claim 1, further comprising the step of receiving signals from outside the integrated circuit to an input/output circuit of the integrated circuit for transmission on the data bus.

9. An integrated circuit comprising:

a logic processor;

a data bus;

an address bus;

a program memory coupled to the address bus and data bus;

an analog-to-digital converter coupled to the logic processor;

a multiplexer accepting a plurality of analog inputs having an output coupled to the analog-to-digital converter;

a fuzzy logic coprocessor which receives, from a source external to the integrated circuit, program instructions capable of being executed by the fuzzy logic coprocessor, wherein the data bus and address bus couples the logic processor to the fuzzy logic coprocessor; and a memory of the fuzzy logic coprocessor, the memory having an address decoder, the address decoder accepting an output of the multiplexer of the fuzzy logic coprocessor and which is coupled to the address bus of the logic processor unit, and wherein the memory is configured to store the received program instructions.

10. The integrated circuit according to claim 9, the logic processor further comprising a decoder coupled to the address bus and coupled to an actuator peripheral.

11. The integrated circuit according to claim 9, the fuzzy logic coprocessor comprising:

a processor;

a multiplexer; and an address bus coupling the processor to the multiplexer.

12. The integrated circuit according to claim 9, wherein the memory of the fuzzy logic coprocessor is directly coupled to the processor of the fuzzy logic coprocessor.

13. The integrated circuit of claim 9, wherein the memory of the fuzzy logic coprocessor is a volatile-type memory.

* * * * *